US012687421B2

(12) United States Patent
Fang

(10) Patent No.: US 12,687,421 B2
(45) Date of Patent: Jul. 21, 2026

(54) WEIGHING UNIT, BATCHING METHOD, AND AUTOMATIC BATCHING SYSTEM FOR FLOOR PRODUCTION

(71) Applicant: STARS UNION EQUIPMENT TECHNOLOGY (JIANGSU) CO., LTD., Jiangsu (CN)

(72) Inventor: Yin Fang, Jiangsu (CN)

(73) Assignee: STARS UNION EQUIPMENT TECHNOLOGY (JIANGSU) CO., LTD., Jiangsu (CN)

( * ) Notice: Subject to any disclaimer, the term of this patent is extended or adjusted under 35 U.S.C. 154(b) by 364 days.

(21) Appl. No.: 18/264,231

(22) PCT Filed: Apr. 19, 2023

(86) PCT No.: PCT/CN2023/089187

§ 371 (c)(1),
(2) Date: Aug. 3, 2023

(87) PCT Pub. No.: WO2024/169036

PCT Pub. Date: Aug. 22, 2024

(65) Prior Publication Data

US 2025/0003788 A1 Jan. 2, 2025

(30) Foreign Application Priority Data

Feb. 13, 2023 (CN) .......................... 202310107372.3

(51) Int. Cl.
G01G 13/18 (2006.01)
G01G 13/26 (2006.01)
G01G 23/01 (2006.01)

(52) U.S. Cl.
CPC ............. *G01G 13/18* (2013.01); *G01G 13/26* (2013.01); *G01G 23/01* (2013.01)

(58) Field of Classification Search
CPC ......... G01G 13/18; G01G 13/26; G01G 23/01
See application file for complete search history.

(56) References Cited

U.S. PATENT DOCUMENTS 4,204,773 A * 5/1980 Bates ........................ B28C 9/00
366/18
10,814,295 B2 * 10/2020 Margalit ........... B01F 35/71775
(Continued)

FOREIGN PATENT DOCUMENTS

CN 202778398 U * 3/2013
CN 105032275 11/2015
(Continued)

OTHER PUBLICATIONS

Translation of CN-202778398-U (Year: 2013).*

*Primary Examiner* — Natalie Huls
(74) *Attorney, Agent, or Firm* — Levine Bagade Han LLP

(57) ABSTRACT

The present disclosure provides a weighing unit, a batching method, and an automatic batching system for floor production, relating to the field of floor manufacturing. The automatic batching system for floor production comprises a weighing control unit, a weighing unit, and a plurality of material mixing units. The weighing unit is electrically connected to the weighing control unit; and the plurality of material mixing units are in communication with the weighing unit respectively. The batching system can solve, to a certain extent, the problems of relatively large quality differences between mixed materials, a relatively high failure rate of the weighing control unit, and relatively low control accuracy.

16 Claims, 5 Drawing Sheets

(56) References Cited

U.S. PATENT DOCUMENTS

| | | | | |
|---|---|---|---|---|
| 2005/0024988 | A1 | 2/2005 | Hoff et al. | |
| 2009/0039106 | A1 * | 2/2009 | Moretto .................... | B29B 7/28 |
| | | | | 141/1 |

FOREIGN PATENT DOCUMENTS

| | | | | | |
|---|---|---|---|---|---|
| CN | 105032275 | A | * | 11/2015 | |
| CN | 106346614 | | | 1/2017 | |
| CN | 106346614 | A | * | 1/2017 | ............. B28C 7/122 |
| CN | 106999882 | | | 8/2017 | |
| CN | 110498259 | | | 11/2019 | |
| CN | 214613418 | | | 11/2021 | |
| WO | WO-2013038394 | A2 | * | 3/2013 | ........... G01G 13/024 |
| WO | WO 2015/107517 | | | 7/2015 | |

* cited by examiner

1

10

C

D

B

E

221

WEIGHING UNIT, BATCHING METHOD, AND AUTOMATIC BATCHING SYSTEM FOR FLOOR PRODUCTION

CROSS-REFERENCES TO RELATED APPLICATIONS

This application is a U.S. national phase application of International Application PCT/CN2023/089187 filed Apr. 19, 2023, which claims priority to Chinese patent application No. CN 202310107372.3 filed on Feb. 13, 2023, the contents of which are incorporated herein by reference in their entireties.

TECHNICAL FIELD

The present disclosure relates to the field of floor manufacturing, and in particular, to a weighing unit, a batching method, and an automatic batching system for floor production.

BACKGROUND ART

In the related art, an automatic batching system for floor production usually includes a weighing control unit, a weighing unit, and a material mixing unit. However, the automatic batching system in the related art has problems of a relatively large quality differences between mixed materials, a relatively high failure rate of the weighing control unit, and relatively low control accuracy, thus affecting the production of floor.

SUMMARY

The present disclosure provides a weighing unit, a batching method, and an automatic batching system for floor production, which can solve, to a certain extent, the problems of relatively large quality differences between mixed materials, a relatively high failure rate of the weighing control unit, and relatively low control accuracy.

Embodiments of the present disclosure are realized as follows.

According to an exemplary embodiment of the present disclosure, an automatic batching system for floor production is provided, which may include a weighing control unit, a weighing unit, and a plurality of material mixing units. The weighing unit can be electrically connected to the weighing control unit; and the plurality of material mixing units are in communication with the weighing unit respectively.

In the above technical solution, one weighing control unit is corresponding to one weighing unit, and one weighing unit is simultaneously corresponding to a plurality of material mixing units, i.e., the whole automatic batching system is in a one-to-one and then one-to-many mode, which, compared with the automatic batching systems in the conventional mode (usually in a one-to-many, and then one-to-one mode, i.e., one weighing control unit is simultaneously corresponding to a plurality of weighing units, and one weighing unit is corresponding to only one material mixing unit), can effectively reduce quality differences between mixed materials of different material mixing units caused by system errors of the weighing units and external factors, so as to improve the quality consistency of different material mixing units, further contributing to improving the quality of floor prepared; meanwhile, since the automatic batching system provided in the embodiment of the present disclosure adopts a form in which one weighing control unit is corresponding to only one weighing unit, the control accuracy of the weighing control unit can be improved while reducing the failure rate thereof.

In some optional embodiments, the weighing unit can include a plurality of material storage hoppers, a weighing hopper, a transition hopper, and a fixed bracket. A bottom discharge port of each material storage hopper can be provided with a first switch valve; the weighing hopper can be located below the plurality of material storage hoppers and in communication with the bottom discharge ports of the plurality of material storage hoppers, and a bottom discharge port of the weighing hopper can be provided with a second switch valve; the transition hopper can be located below the weighing hopper and in communication with the bottom discharge port of the weighing hopper, a bottom discharge port of the transition hopper can be in communication with the plurality of material mixing units, and the bottom discharge port of the transition hopper can be provided with a third switch valve; the weighing hopper can be connected to the fixed bracket through a first weighing component, and the transition hopper cane connected to the fixed bracket; and the first switch valve, the second switch valve, and the third switch valve can be electrically connected to the weighing control unit respectively.

In the above technical solution, the weighing unit is additionally provided with the plurality of material storage hoppers, which can serve the purpose of temporarily storing raw materials, and compared with the conventional weighing unit (the weighing hopper of the weighing unit is directly connected with a material storage bin through a pipeline and a valve, thus relatively long material preparation time is required after one time of material mixing is ended), can realize a continuous weighing and material mixing process, so as to improve overall efficiency of batching; in addition, the weighing unit is further additionally provided with the transition hopper, which can premix various weighed raw materials before mixing them, and compared with cases without providing the transition hopper, can improve stability and mixing uniformity of the raw materials, further improving the quality of the floor prepared.

In some optional embodiments, the transition hopper can be connected to the fixed bracket through a second weighing component.

In the above technical solution, the transition hopper is endowed with a weighing function, that is, the weighing unit provided in the embodiment of the present disclosure has two weighing processes (both the weighing hopper and the transition hopper can weigh the raw materials), which, compared with the conventional weighing unit (usually only weighing once with the weighing hopper), can improve the weighing accuracy, and meanwhile also can achieve the purpose of system self-check with two weighing results.

In some optional embodiments, the bottom discharge ports of the plurality of material storage hoppers can be respectively in communication with the weighing hopper through a material-pushing spiral structure; and optionally, in the plurality of material storage hoppers, the material-pushing spiral structure of the material storage hoppers for storing small materials can be of a structure in a double helix form.

In the above technical solution, the raw materials in the material storage hoppers are conveyed to the weighing hopper through the material-pushing spiral structure, which, compared with the conventional conveying method (directly conveying through a pipeline), has the advantages of high raw material conveying efficiency and being not easily blocked.

Optionally, a reason of conveying the small materials by the material-pushing spiral structure in a double helix form is that in the entire batching phase, the small materials account for a minimum proportion and component (i.e., mass of the small materials each time conveyed from the material storage hoppers to the weighing hopper) accuracy of the small materials usually directly affects physicochemical properties (for example, pores, density, surface flatness, surface smoothness, surface hardness, and toughness of floor surface) of the floor subsequently prepared. Therefore, with the material-pushing spiral structure in a double helix form, i.e., a manner of first pushing materials by a main screw and then pushing materials by an auxiliary screw, accurate control over the component of the small materials can be realized, further improving the quality of the floor prepared.

In some optional embodiments, a hopper wall of the weighing hopper and a hopper wall of the transition hopper can be both provided with a vibration component; and optionally, the vibration component can include an air disc and an air compressor in communication with the air disc, and the air disc is connected to the hopper walls.

In the above technical solution, the hopper walls of various functional hoppers in the weighing unit are each additionally provided with the vibration component, and then the raw materials attached to the hopper walls can be made to fall off by vibration generated by the vibration components, so as to achieve the purpose of cleaning the hopper walls.

Optionally, a reason of providing the vibration component in a form in which the air disc and the air compressor are matched is that the vibration component in this form has an advantage of relatively good vibration effect, and meanwhile, the vibration component in this form can be compatible with many functional hoppers.

In some optional embodiments, hopper walls of the plurality of material storage hoppers each can be provided with a stirring structure, and the stirring structure can have a stirring component located in a material storage cavity in the material storage hoppers.

In the above technical solution, each material storage hopper is additionally provided with a stirring device, then the raw materials in the material storage hopper are always in a turbulent state under the action of the stirring device, so as to prevent solidification of the raw materials in the material storage hopper, and thus the raw materials can be more conveniently conveyed to the weighing hopper.

In some optional embodiments, the hopper walls of the plurality of material storage hoppers each can be provided with a material level meter; and optionally, the hopper wall of each material storage hopper can be provided with a plurality of material level meters, and the plurality of material level meters are distributed at intervals along a height direction of the material storage hoppers.

In the above technical solution, by additionally providing the material storage hoppers with the material level meter, a material surface level of the raw materials in the material storage hoppers can be acquired by the material level meter at any time, so that the amount of raw materials in the material storage hoppers can be visually acquired, to better guide the raw material weighing.

Optionally, each material storage hopper can be provided with a plurality of material level meters, and the plurality of material level meters are distributed at intervals along a height direction of the material storage hopper. With such configuration, the amount of raw materials in the material storage hopper can be more conveniently acquired.

Optionally, a fan and a dust remover can be connected to a top portion of the material storage hoppers, and the dust remover can be in communication with the fan.

Optionally, the first weighing component can include three pressure sensors.

According to an exemplary embodiment of the present disclosure, a weighing unit for floor production is provided, which may include a plurality of material storage hoppers, a weighing hopper, a transition hopper, and a fixed bracket. A bottom discharge port of each material storage hopper can be provided with a first switch valve; the weighing hopper can be located below the plurality of material storage hoppers and simultaneously in communication with the bottom discharge ports of the plurality of material storage hoppers, and a bottom discharge port of the weighing hopper can be provided with a second switch valve; the transition hopper can be located below the weighing hopper and in communication with the bottom discharge port of the weighing hopper, a bottom discharge port of the transition hopper can be in communication with the plurality of material mixing units, and the bottom discharge port of the transition hopper can be provided with a third switch valve; and the weighing hopper can be connected to the fixed bracket through a first weighing component, and the transition hopper can be connected to the fixed bracket.

In some optional embodiments, the transition hopper can be connected to the fixed bracket through a second weighing component.

In addition, according to an exemplary embodiment of the present disclosure, a batching method for floor production is provided, using the weighing unit for floor production provided in the above embodiments for batching, wherein the batching method for floor production can include:

weighing raw materials used in sequence by the weighing hopper and obtaining a first actual total mass of the raw materials used; comparing the first actual total mass with a theoretical total mass to obtain a first error value, performing a subsequent process if the first error value is within a preset range; and if the first error value is not within the preset range, performing system self-check until the first error value is within the preset range;

optionally, the transition hopper is connected to the fixed bracket through a second weighing component, and the batching method for floor production further can include: after the first error value satisfies the preset range, weighing the raw materials used in sequence by the transition hopper and obtaining a second actual total mass of the raw materials used; and comparing the second actual total mass with the theoretical total mass to obtain a second error value, performing a subsequent material mixing process if the second error value is within the preset range; and if the second error value is not within the preset range, performing system self-check until the second error value is within the preset range.

In the above technical solution, the subsequent process is performed until the first error value obtained satisfies a preset requirement, which, compared with directly performing the subsequent process after weighing, can make the batching process have relatively high accuracy in the weighing stage, thus improving the quality of the floor prepared.

Optionally, after the first error value satisfies the preset range, the subsequent material mixing process is performed until the second error value obtained also satisfies the preset requirement, which, compared with directly performing the subsequent process after the first error value satisfies the preset range, can make the batching process have a higher accuracy in the weighing stage, thus improving the quality of the floor prepared.

BRIEF DESCRIPTION OF DRAWINGS

In order to illustrate the technical solutions of embodiments of the present disclosure clearer, drawings which need to be used in the embodiments will be introduced briefly below. It should be understood that the following drawings merely show some embodiments of the present disclosure, and therefore should not be construed as limitation to the scope. Those ordinarily skilled in the art, still could obtain other relevant drawings according to these drawings without using any creative efforts.

Figure 1:
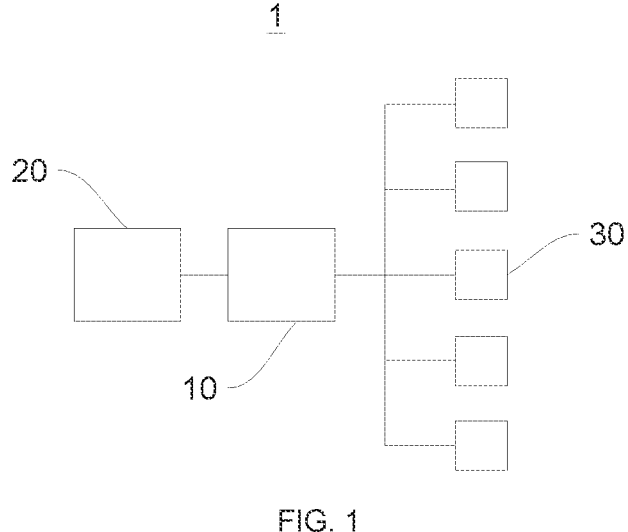
FIG. 1 is a schematic layout diagram of an automatic batching system for floor production provided in an embodiment of the present disclosure.

Reference signs: 1—automatic batching system for floor production; 10—weighing unit; 20—weighing control unit; 30—material mixing unit; 100—material storage hopper; 110—first switch valve; 120—stirring structure; 130—material level meter; 200—weighing hopper; 210—second switch valve; 220—vibration component; 221—air disc; 300—transition hopper; 310—third switch valve; 400—fixed bracket; 500—first weighing component; 600—second weighing component; 700—material-pushing spiral structure.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below with reference to the drawings in the embodiments of the present disclosure. Apparently, the embodiments described are some but not all embodiments of the present disclosure. Generally, components in the embodiments of the present disclosure, as described and shown in the drawings herein, may be arranged and designed in various different configurations.

Therefore, the detailed description below of the embodiments of the present disclosure provided in the drawings are not intended to limit the claimed scope of the present disclosure, but merely illustrate chosen embodiments of the present disclosure. All of other embodiments obtained by those ordinarily skilled in the art based on the embodiments in the present disclosure without using any creative efforts shall fall within the scope of protection of the present disclosure.

It should be noted that similar reference signs and letters represent similar items in the following drawings, therefore, once a certain item is defined in one drawing, it is not needed to be defined or explained in subsequent drawings.

In the description of the present disclosure, it should be noted that orientation or positional relationships indicated by terms such as "upper", "lower", "inner", and "outer" are based on orientation or positional relationships as shown in the drawings, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limiting the present disclosure. Besides, terms such as "first", "second", and "third" are merely used for distinguishing the description, but should not be construed as indicating or implying importance in the relativity.

In the description of the present disclosure, it further needs to be noted that unless otherwise specified and defined explicitly, terms "provide", "mount", and "connect" should be construed in a broad sense. For example, it may be a fixed connection, and also may be a detachable connection, or an integrated connection; it may be a direct connection, and also may be an indirect connection through an intermediary, or inner communication between two elements. For a person ordinarily skilled in the art, the specific meanings of the above-mentioned terms in the present disclosure could be construed in accordance with specific circumstances.

In the prior art, for the batching systems for floor production, generally, one weighing control unit is simultaneously corresponding to a plurality of weighing units, and one weighing unit is corresponding to only one material mixing unit, i.e. a one-to-many-to-one mode. The batching systems of this mode have the following problems.

1. One weighing unit is corresponding to only one material mixing unit, but in an actual production process, a plurality of weighing units and material mixing units are usually simultaneously required, the material mixing units themselves have certain differences, and there are additionally influences of system errors and external factors, then mixed materials prepared by different material mixing units have relatively large quality differences, further making quality consistency of the floor finally prepared relatively poor.

2. A control program for one weighing control unit simultaneously corresponding to a plurality of weighing units has great difficulty in programming, meanwhile, such control manner also has problems of relatively low control accuracy and relatively high failure rate, which is not conducive to performing the batching process.

Based on this, the inventor has found upon researches that: by optimizing the batching systems for floor production, i.e., making one weighing control unit corresponding to one weighing unit, and one weighing unit simultaneously corresponding to a plurality of material mixing units (i.e., one-to-many and then one-to-one mode), quality differences between mixed materials of different material mixing units caused by system errors and external factors can be effectively reduced, so as to improve quality consistency of different material mixing units; and meanwhile, the control accuracy of the weighing control unit can be improved while reducing the failure rate thereof.

Referring to FIG. 1, an embodiment of the present disclosure provides an automatic batching system 1 for floor production, including a weighing control unit 20, a weighing unit 10, and a plurality of material mixing units 30. The weighing unit 10 is electrically connected to the weighing control unit 20; and the plurality of material mixing units 30 are respectively in communication with the weighing unit 10.

It should be noted that "communication" in that the plurality of material mixing units 30 respectively are in communication with the weighing unit 10 means that a plurality of material mixing units 30 are corresponding to one weighing unit 10, but does not require that they must be physically connected.

It should be noted that, the number of the material mixing units 30 is not limited, and can be adjusted according to actual needs.

In the present disclosure, one weighing control unit 20 is corresponding to one weighing unit 10, and one weighing unit 10 is simultaneously corresponding to a plurality of material mixing units 30, that is, the whole automatic batching system is in a one-to-one and then one-to-many mode, which, compared with the automatic batching systems in the conventional mode (usually in a one-to-many, and then one-to-one mode, i.e., one weighing control unit 20 is simultaneously corresponding to a plurality of weighing units 10, and one weighing unit 10 is corresponding to only one material mixing unit 30), can effectively reduce quality differences between mixed materials of different material mixing units 30 caused by system errors of the weighing units 10 and external factors, so as to improve the quality consistency of different material mixing units 30, further contributing to improving the quality of floor prepared; meanwhile, since the automatic batching system provided in the embodiment of the present disclosure adopts a form in which one weighing control unit 20 is corresponding to only one weighing unit 10, the control accuracy of the weighing control unit 20 can be improved while reducing the failure rate thereof.

Referring to FIG. 2 to FIG. 6, as an example, the weighing unit 10 includes a plurality of material storage hoppers 100, a weighing hopper 200, a transition hopper 300, and a fixed bracket 400. A bottom discharge port of each material storage hopper 100 is provided with a first switch valve 110; the weighing hopper 200 is located below the plurality of material storage hoppers 100 and is in communication with the bottom discharge ports of the plurality of material storage hoppers 100, and a bottom discharge port of the weighing hopper 200 is provided with a second switch valve 210; the transition hopper 300 is located below the weighing hopper 200 and is in communication with the bottom discharge port of the weighing hopper 200, a bottom discharge port of the transition hopper 300 is in communication with the plurality of material mixing units 30, and the bottom discharge port of the transition hopper 300 is provided with a third switch valve 310; the weighing hopper 200 is connected to the fixed bracket 400 through a first weighing component 500, and the transition hopper 300 is connected to the fixed bracket 400; and the first switch valve 110, the second switch valve 210, and the third switch valve 310 are electrically connected to the weighing control unit 20 respectively.

In this embodiment, the weighing unit 10 is additionally provided with the plurality of material storage hoppers 100, which can serve the purpose of temporarily storing raw materials, and compared with the conventional weighing unit 10 (the weighing hopper 200 of the weighing unit 10 is directly connected with a material storage bin through a pipeline and a valve, thus relatively long material preparation time is required after one time of material mixing is ended), can realize a continuous weighing and material mixing process, so as to improve overall efficiency of batching; in addition, the weighing unit 10 is further additionally provided with the transition hopper 300, which can premix various weighed raw materials before mixing them, and compared with cases without providing the transition hopper 300, can improve stability and mixing uniformity of the raw materials, further improving the quality of the floor prepared.

It should be noted that various material storage hoppers 100 in the weighing unit 10 are respectively in communication with corresponding material feeding bins.

It should be noted that, a manner of conveying production raw materials from various material feeding bins to various material storage hoppers 100 is not limited, and a form of evacuating interior of various material storage hoppers 100, i.e., a form of negative-pressure feeding, can be used; and it is also feasible to use a form of providing a positive pressure at one end of the material storage bin.

As an example, a fan is connected to a top portion of the material storage hoppers 100, and the material storage hoppers 100 are in communication with corresponding material feeding bins through a pipeline.

It should be noted that, considering cleanliness of the raw materials, structure of the material storage hoppers 100 can be adjusted.

As an example, a dust remover is connected to the top portion of the material storage hoppers 100, and the dust remover is connected to the fan.

It should be noted that, the dust remover is not limited in type, and can be provided according to conventional selections in the art.

As an example, the dust remover is a pulsed dust remover (i.e., a dust remover with a back-blowing dust removal device).

It should be noted that, the first weighing component 500 is not limited in form, and can be provided according to conventional selections in the art, as long as a weighing function can be realized.

As one example, the first weighing component 500 includes three pressure sensors, each including four components.

It can be understood that accuracy in weighing stage will affect the quality of the floor finally prepared. In order to be capable of improving the weighing accuracy, structure of the weighing unit 10 can be optimized.

Figure 7:
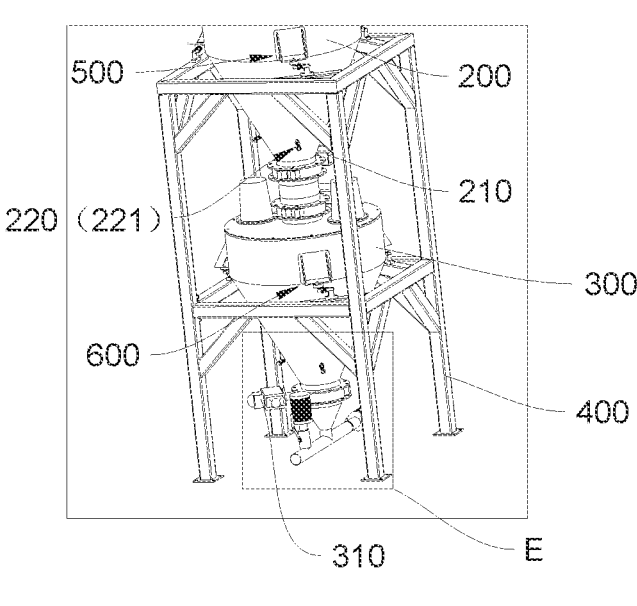
FIG. 7 is an enlarged view of place B in FIG. 2.
Figure 8:
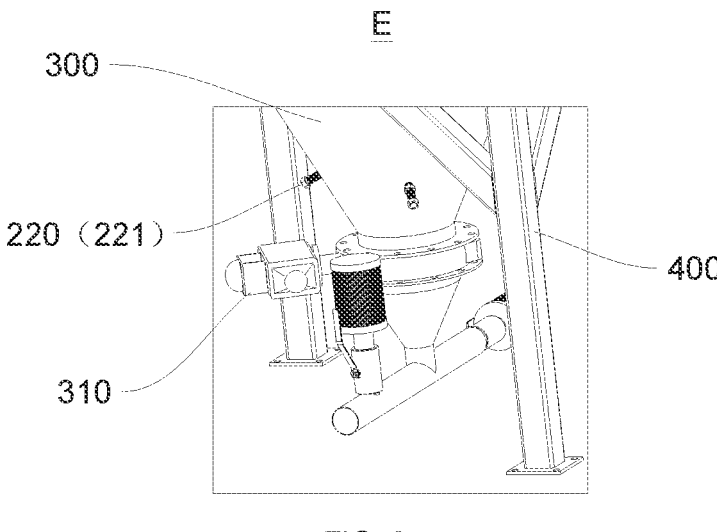
FIG. 8 is an enlarged view of place E in FIG. 7.

Referring to FIG. 7 and FIG. 8, as an example, the transition hopper 300 is connected to the fixed bracket 400 through a second weighing component 600.

In this embodiment, the transition hopper 300 is endowed with a weighing function, that is, the weighing unit 10 provided in the embodiment of the present disclosure has two weighing processes (both the weighing hopper 200 and the transition hopper 300 can weigh the raw materials), which, compared with the conventional weighing unit 10 (usually only weighing once with the weighing hopper 200), can improve the weighing accuracy, and meanwhile also can achieve the purpose of system self-check with two weighing results.

It should be noted that, the second weighing component 600 is not limited in composition, and can be provided with reference to the first weighing component 500.

It should be noted that, a communication manner of the material storage hoppers 100 and the weighing hopper 200 is not limited, and can be provided according to conventional selections in the art.

As an example, the bottom discharge ports of the plurality of material storage hoppers 100 are respectively in communication with the weighing hopper 200 through a material-pushing spiral structure 700.

Optionally, in the plurality of material storage hoppers 100, the material-pushing spiral structure 700 of the material storage hoppers 100 for storing small materials is of a structure in a double helix form.

It should be noted that, a specific model of the material-pushing spiral structure 700 is not limited, and can be adjusted according to physicochemical properties of the raw materials.

In this embodiment, the raw materials in the material storage hoppers 100 are conveyed to the weighing hopper 200 through the material-pushing spiral structure 700, which, compared with the conventional conveying method (directly conveying through a pipeline), has the advantages of high raw material conveying efficiency and being not easily blocked.

Optionally, a reason of conveying the small materials by the material-pushing spiral structure 700 in a double helix form is that in the entire batching phase, the small materials account for a minimum proportion and component (i.e., mass of the small materials each time conveyed from the material storage hoppers 100 to the weighing hopper 200) accuracy of the small materials usually directly affects physicochemical properties (for example, pores, density, surface flatness, surface smoothness, surface hardness, and toughness of floor surface) of the floor subsequently prepared. Therefore, with the material-pushing spiral structure 700 in a double helix form, i.e., a manner of first pushing materials by a main screw and then pushing materials by an auxiliary screw, accurate control over the component of the small materials can be realized, further improving the quality of the floor prepared.

It can be understood that the raw materials are usually attached to inner walls of various functional hoppers, and considering cleanliness of hopper walls, structure of various functional hoppers can be adjusted.

Figure 9:
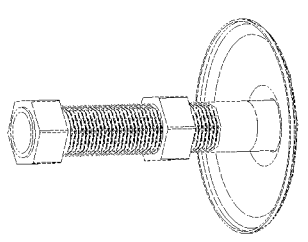
FIG. 9 is a structural schematic view of an air disc provided in an embodiment of the present disclosure.

Referring to FIG. 8 and FIG. 9, as an example, a hopper wall of the weighing hopper 200 and a hopper wall of the transition hopper 300 are both provided with a vibration component 220.

Optionally, the vibration component 220 includes an air disc 221 and an air compressor in communication with the air disc 221, and the air disc 221 is connected to the hopper walls.

It should be noted that, "hopper walls" in that the air disc 221 is connected to the hopper walls refer to the hopper wall of the weighing hopper 200 and the hopper wall of the transition hopper 300, that is, the hopper walls of functional hoppers provided with the vibration component 220.

In this embodiment, the hopper walls of various functional hoppers in the weighing unit 10 are each additionally provided with the vibration component 220, and then the raw materials attached to the hopper walls can be made to fall off by vibration generated by the vibration components, so as to achieve the purpose of cleaning the hopper walls.

Optionally, a reason of providing the vibration component 220 in a form in which the air disc 221 and the air compressor are matched is that the vibration component 220 in this form has an advantage of relatively good vibration effect, and meanwhile, the vibration component 220 in this form can be compatible with many functional hoppers.

It should be noted that, structure of the material storage hoppers 100 can be adjusted in consideration of convenience of conveying the raw materials.

As an example, hopper walls of the plurality of material storage hoppers 100 are each provided with a stirring structure 120, and the stirring structure 120 has a stirring component located in a material storage cavity in the material storage hoppers 100.

It should be noted that the stirring structure 120 is not limited in form, and can be provided according to conventional selections in the art, as long as a stirring function can be realized.

In this embodiment, each material storage hopper 100 is additionally provided with a stirring device, then the raw materials in the material storage hopper 100 are always in a turbulent state under the action of the stirring device, so as to prevent solidification of the raw materials in the material storage hopper 100, and thus the raw materials can be more conveniently conveyed to the weighing hopper 200.

It should be noted that, in order to better observe the amount of raw materials in the material storage hoppers 100, the structure of the material storage hoppers 100 can be adjusted.

As an example, the hopper walls of the plurality of material storage hoppers 100 are each provided with a material level meter 130.

Optionally, the hopper wall of each material storage hopper 100 is provided with a plurality of material level meters 130, and the plurality of material level meters 130 are distributed at intervals along a height direction of the material storage hopper 100.

In this embodiment, by additionally providing the material storage hoppers 100 with the material level meter 130, a material surface level of the raw materials in the material storage hoppers 100 can be acquired by the material level meter 130 at any time, so that the amount of raw materials in the material storage hoppers 100 can be visually acquired, to better guide the raw material weighing.

Optionally, each material storage hopper 100 is provided with a plurality of material level meters 130, and the plurality of material level meters 130 are distributed at intervals along a height direction of the material storage hopper 100. With such configuration, the amount of raw materials in the material storage hopper 100 can be more conveniently acquired.

It should be noted that all structures or functional units not specifically described or defined in the automatic batching system can be provided according to conventional selections in the art.

Figure 2:
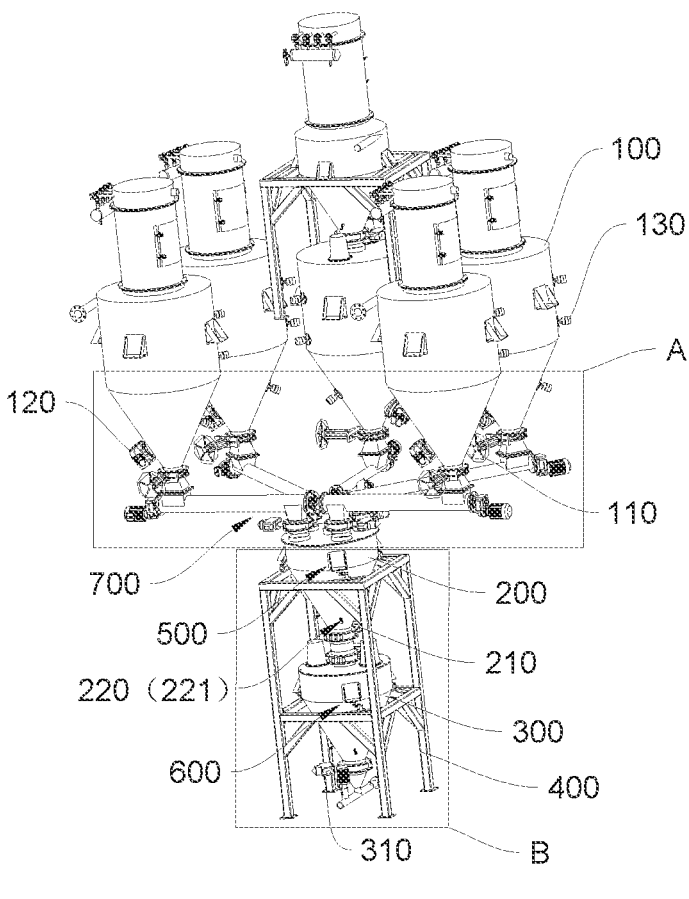
FIG. 2 is a structural schematic view of a weighing unit provided in an embodiment of the present disclosure.
Figures 3, 4:
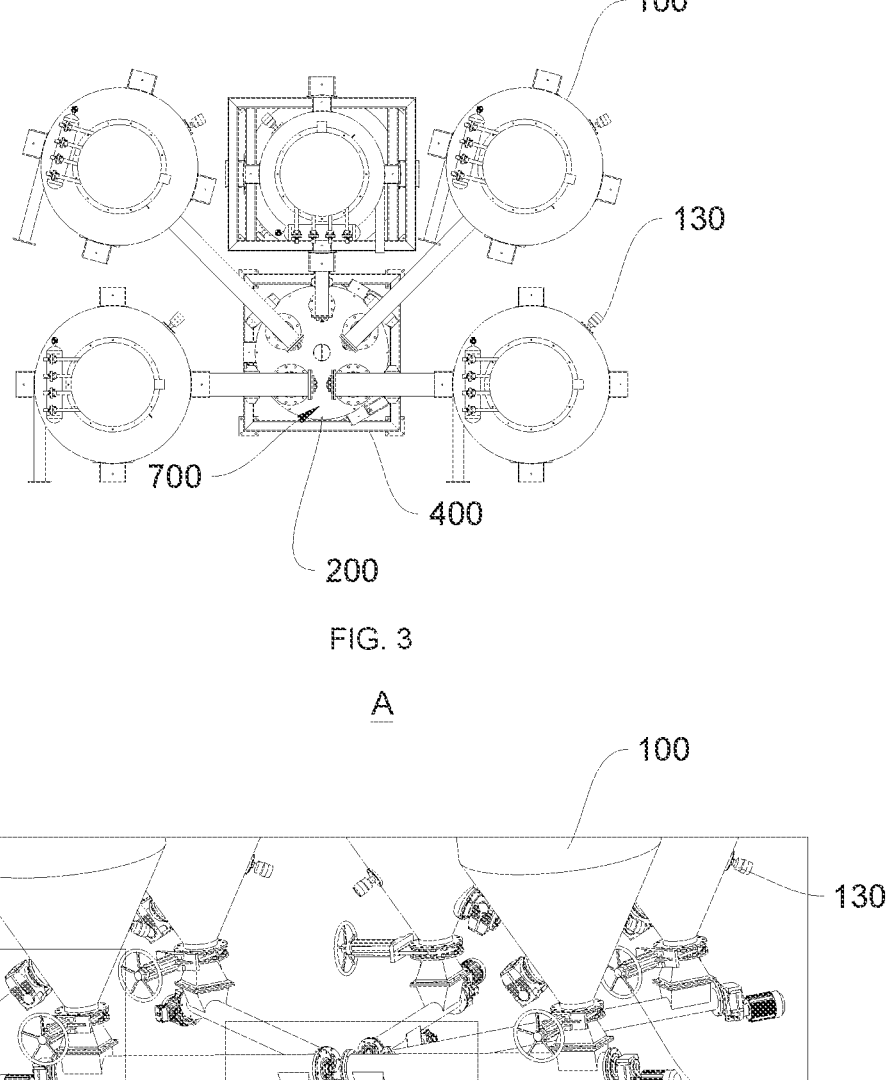
FIG. 3 is a structural schematic view of the weighing unit provided in an embodiment of the present disclosure from another viewing angle.
FIG. 4 is an enlarged view of place A in FIG. 2.
Figure 5:
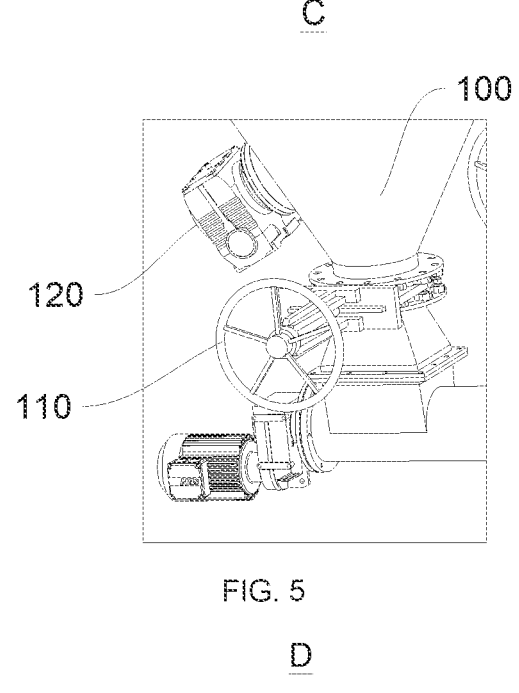
FIG. 5 is an enlarged view of place C in FIG. 4.
Figure 6:
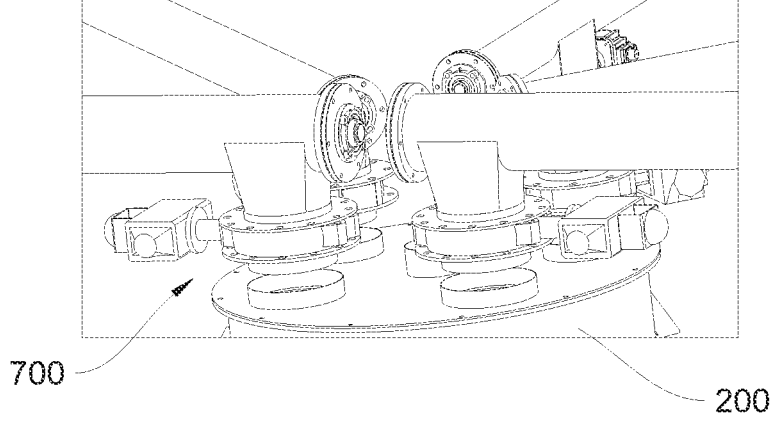
FIG. 6 is an enlarged view of place D in FIG. 4.

Referring to FIG. 2 to FIG. 3, an exemplary embodiment of the present disclosure provides a weighing unit 10 for floor production, which includes a plurality of material storage hoppers 100, a weighing hopper 200, a transition hopper 300, and a fixed bracket 400. A bottom discharge port of each material storage hopper 100 is provided with a first switch valve 110; the weighing hopper 200 is located below the plurality of material storage hoppers 100 and is in communication simultaneously with the bottom discharge ports of the plurality of material storage hoppers 100, and a bottom discharge port of the weighing hopper 200 is provided with a second switch valve 210; the transition hopper 300 is located below the weighing hopper 200 and is in communication with the bottom discharge port of the weighing hopper 200, a bottom discharge port of the transition hopper 300 is in communication with the plurality of material mixing units 30, and the bottom discharge port of the transition hopper 300 is provided with a third switch valve 310; the weighing hopper 200 is connected to the fixed bracket 400 through a first weighing component 500, and the transition hopper 300 is connected to the fixed bracket 400.

In the present disclosure, for configuration of the weighing unit 10 for floor production, reference can be made to the weighing unit 10 provided in the above embodiments.

It can be understood that accuracy in a weighing stage will affect the quality of the floor finally prepared. In order to be capable of improving the weighing accuracy, structure of the weighing unit 10 can be optimized.

As an example, the transition hopper 300 is connected to the fixed bracket 400 through a second weighing component 600.

An exemplary embodiment of the present disclosure provides a batching method for floor production, using the weighing unit for floor production provided in the above embodiments for batching, and the batching method for floor production includes:

weighing raw materials used in sequence by a weighing hopper and obtaining a first actual total mass of the raw materials used; and comparing the first actual total mass with a theoretical total mass to obtain a first error value, performing a subsequent process if the first error value is within a preset range; and if the first error value is not within the preset range, performing system self-check until the first error value is within the preset range.

Optionally, the transition hopper is connected to the fixed bracket through a second weighing component, and the batching method for floor production further includes: after the first error value satisfies the preset range, weighing the raw materials used in sequence by the transition hopper and obtaining a second actual total mass of the raw materials used; comparing the second actual total mass with the theoretical total mass to obtain a second error value, performing a subsequent material mixing process if the second error value is within the preset range; and if the second error value is not within the preset range, performing system self-check until the second error value is within the preset range.

It should be noted that a reason of "weighing the raw materials used in sequence" is that many types of raw materials will be used in floor preparation. Taking production of WPC floor as an example, raw materials include resin, calcium carbonate, small materials, and recycled materials. However, a specific weighing order is not limited, and can be adjusted according to actual needs, for example, the weighing can be carried out in an order of resin, calcium carbonate, recycled materials, and small materials.

It should be noted that the "subsequent process" refers to the subsequent material mixing process when there is no second weighing component, and refers to a following second weighing process when there is the second weighing component.

It should be noted that contents of "system self-check" can be performed according to conventional operations in the art, including for example, firstly checking whether various functional units in the weighing unit are normal (for example, installation problems such as whether the weighing hopper is inclined and checking whether sensors in the weighing components have a fault); and after that, debugging software control program, checking whether various parameter settings are correct or not, etc.

In the present disclosure, the subsequent process is performed until the first error value obtained satisfies a preset requirement, which, compared with directly performing the subsequent process after weighing, can make the batching process have relatively high accuracy in the weighing stage, thus improving the quality of the floor prepared.

Optionally, after the first error value satisfies the preset range, the subsequent material mixing process is performed until the second error value obtained also satisfies the preset requirement, which, compared with directly performing the subsequent process after the first error value satisfies the preset range, can make the batching process have relatively high accuracy in the weighing stage, thus improving the quality of the floor prepared.

In order to better understand the technical solution, the weighing step in the batching method is specifically described herein (taking weighing the raw materials for producing WPC floor as an example, in which a weighing order of the raw materials is resin, calcium carbonate, recycled material, and small materials in sequence):

setting that the theoretical total mass of the batching this time is M, the first actual total mass weighed by the weighing hopper is $M_0$, and the second actual total mass weighed by the transition hopper is M'.

Theoretically:

$$M = m_a + m_b + m_c + m_d$$

$$m_a = \frac{Ma}{a+b+c+d}, m_b = \frac{Mb}{a+b+c+d},$$

$$m_c = \frac{Mc}{a+b+c+d}, m_d = \frac{Md}{a+b+c+d}$$

In the above, $m_a$, $m_b$, $m_c$, and $m_d$ represent theoretical masses of four raw materials respectively, and a, b, c, and d represent theoretical mass ratios of the four raw materials respectively.

Actually:

$$M_0 = m_{a1} + m_{b1} + m_{c1} + m_{d1}$$

$$m_{a1} = M_{a1} + M_{a2} + M_{a3}, m_{b1} = M_{b1} + M_{b2} + M_{b3}$$

$$m_{c1} = M_{c1} + M_{c2} + M_{c3}, m_{d1} = M_{d1} + M_{d2} + M_{d3}$$

In the above, $m_{a1}$, $m_{b2}$, $m_{c3}$, and mas represent actual masses of the four raw materials weighed by the weighing hopper respectively, and $M_{a1}$, $M_{a2}$, and $M_{a3}$ represent numerical values of the resin weighed by three pressure sensors respectively.

If a following condition can be met:

$$M = M_0 \pm 0.5$$

i.e., $m_a + m_b + m_c + m_d = (m_{a1} + m_{b1} + m_{c1} + m_{d1}) \pm 0.5$ $$\left( \frac{Ma}{a+b+c+d} + \frac{Mb}{a+b+c+d} + \right.$$

$$\left. \frac{Mc}{a+b+c+d} + \frac{Md}{a+b+c+d} \right) = [(M_{a1} + M_{a2} + M_{a3}) +$$

$$(M_{b1} + M_b + M_{b3}) + (M_{c1} + M_{c2} + M_{c3}) + (M_{d1} + M_{d2} + M_{d3})] \pm$$

$$0.5 = [(M_{a1} + M_{a2} + M_{a3}) + (M_{b1} + M_b + M_{b3}) + (M_{c1} + M_{c2} + M_{c3}) +$$

$$(M_{d1} + M_{d2} + M_{d3})] \pm (0.125 + 0.125 + 0.125 + 0.125) =$$

$$\left\{ \begin{array}{l} [(M_{a1} + M_{a2} + M_{a3}) \pm 0.125] + [(M_{b1} + M_{b2} + M_{b3}) \pm 0.125] + \\ [(M_{c1} + M_{c2} + M_{c3}) \pm 0.125] + [(M_{d1} + M_{d2} + M_{d3}) \pm 0.125] \end{array} \right\}$$

the following can be obtained:

$$\frac{Ma}{a+b+c+d} = [(M_{a1} + M_{a2} + M_{a3}) \pm 0.125]$$

$$\frac{Mb}{a+b+c+d} = [(M_{b1} + M_{b2} + M_{b3}) \pm 0.125]$$

$$\frac{Mc}{a+b+c+d} = [(M_{c1} + M_{c2} + M_{c3}) \pm 0.125]$$

$$\frac{Md}{a+b+c+d} = [(M_{d1} + M_{d2} + M_{d3}) \pm 0.125]$$

that is:

$$\begin{cases} m_a = m_{a1} \pm 0.125 \\ m_b = m_{b1} \pm 0.125 \\ m_c = m_{c1} \pm 0.125 \\ m_d = m_{d1} \pm 0.125 \end{cases}$$

it can be judged that the first weighing result meets the preset requirement, and the subsequent process can be performed.

By the same reasoning, $M=M'\pm0.5$ can be obtained.

That is, $M=(G_1+G_2+G_3)+0.5$

In the above, $G_1$, $G_2$, and $G_3$ respectively represent numerical values of the three sensors on the transition hopper when weighing.

It should be noted that all processes or steps not specifically described or defined in the batching method can be provided according to conventional selections in the art.

The above-mentioned are merely for preferred embodiments of the present disclosure and not used to limit the present disclosure, and for one skilled in the art, various modifications and changes can be made to the present disclosure. Any modifications, equivalent substitutions, improvements and so on, within the spirit and principle of the present disclosure, should be covered within the scope of protection of the present disclosure.

INDUSTRIAL APPLICABILITY

The present disclosure provides a weighing unit, a batching method, and an automatic batching system for floor production, belonging to the field of floor manufacturing. The automatic batching system for floor production includes a weighing control unit, a weighing unit, and a plurality of material mixing units. The weighing unit is electrically connected to the weighing control unit; and the plurality of material mixing units are in communication with the weighing unit respectively. This batching system can solve, to a certain extent, the problems of relatively large quality differences between mixed materials, a relatively high failure rate of the weighing control unit, and relatively low control accuracy.

Besides, it can be understood that the weighing unit, the batching method, and the automatic batching system for floor production in the present disclosure are reproducible, and can be applied to multiple types of industrial applications. For example, the weighing unit for floor production in the present disclosure can be applied to the field of floor manufacturing.

What is claimed is:

1. An automatic batching system for floor production, wherein the automatic batching system for floor production comprises:

a weighing control unit;

a weighing unit, wherein the weighing unit is electrically connected to the weighing control unit; and a plurality of material mixing units, wherein the plurality of material mixing units are in communication with the weighing unit respectively, wherein the weighing unit comprises:

a plurality of material storage hoppers, wherein a bottom discharge port of each of the material storage hoppers is provided with a first switch valve;

a weighing hopper, wherein the weighing hopper is located below the plurality of material storage hoppers and is in communication with bottom discharge ports of the plurality of material storage hoppers, and a bottom discharge port of the weighing hopper is provided with a second switch valve;

a transition hopper, wherein the transition hopper is located below the weighing hopper and is in communication with the bottom discharge port of the weighing hopper, a bottom discharge port of the transition hopper is in communication with the plurality of material mixing units, and the bottom discharge port of the transition hopper is provided with a third switch valve; and a fixed bracket, wherein the weighing hopper is connected to the fixed bracket through a first weighing component, and the transition hopper is connected to the fixed bracket, wherein the first switch valve, the second switch valve, and the third switch valve are electrically connected to the weighing control unit respectively.

2. The automatic batching system for floor production according to claim 1, wherein the transition hopper is connected to the fixed bracket through a second weighing component.

3. The automatic batching system for floor production according to claim 2, wherein the bottom discharge ports of the plurality of material storage hoppers are respectively in communication with the weighing hopper through a material-pushing spiral structure; and optionally, in the plurality of material storage hoppers, the material-pushing spiral structure of the material storage hoppers for storing small materials is of a structure in a double helix form.

4. The automatic batching system for floor production according to claim 2, wherein a hopper wall of the weighing hopper and a hopper wall of the transition hopper are both provided with a vibration component; and optionally, the vibration component comprises an air disc and an air compressor in communication with the air disc, and the air disc is connected to the hopper walls.

5. The automatic batching system for floor production according to claim 2, wherein hopper walls of the plurality of material storage hoppers are each provided with a stirring structure, and the stirring structure has a stirring component located in a material storage cavity in the material storage hoppers.

6. The automatic batching system for floor production according to claim 2, wherein hopper walls of the plurality of material storage hoppers are each provided with a material level meter; and optionally, a hopper wall of each of the material storage hoppers is provided with a plurality of material level meters, and the plurality of material level meters are distributed at intervals along a height direction of the material storage hoppers.

7. The automatic batching system for floor production according to claim 2, wherein a fan and a dust remover are connected to a top portion of the material storage hoppers, and the dust remover is in communication with the fan.

8. The automatic batching system for floor production according to claim 2, wherein the first weighing component comprises three pressure sensors.

9. The automatic batching system for floor production according to claim 1, wherein the bottom discharge ports of the plurality of material storage hoppers are respectively in communication with the weighing hopper through a material-pushing spiral structure; and optionally, in the plurality of material storage hoppers, the material-pushing spiral structure of the material storage hoppers for storing small materials is of a structure in a double helix form.

10. The automatic batching system for floor production according to claim 9, wherein a hopper wall of the weighing hopper and a hopper wall of the transition hopper are both provided with a vibration component; and optionally, the vibration component comprises an air disc and an air compressor in communication with the air disc, and the air disc is connected to the hopper walls.

11. The automatic batching system for floor production according to claim 9, wherein hopper walls of the plurality of material storage hoppers are each provided with a stirring structure, and the stirring structure has a stirring component located in a material storage cavity in the material storage hoppers.

12. The automatic batching system for floor production according to claim 1, wherein a hopper wall of the weighing hopper and a hopper wall of the transition hopper are both provided with a vibration component; and optionally, the vibration component comprises an air disc and an air compressor in communication with the air disc, and the air disc is connected to the hopper walls.

13. The automatic batching system for floor production according to claim 1, wherein hopper walls of the plurality of material storage hoppers are each provided with a stirring structure, and the stirring structure has a stirring component located in a material storage cavity in the material storage hoppers.

14. The automatic batching system for floor production according to claim 1, wherein hopper walls of the plurality of material storage hoppers are each provided with a material level meter; and optionally, a hopper wall of each of the material storage hoppers is provided with a plurality of material level meters, and the plurality of material level meters are distributed at intervals along a height direction of the material storage hoppers.

15. The automatic batching system for floor production according to claim 1, wherein a fan and a dust remover are connected to a top portion of the material storage hoppers, and the dust remover is in communication with the fan.

16. The automatic batching system for floor production according to claim 1, wherein the first weighing component comprises three pressure sensors.

* * * * *